Jan. 22, 1963  C. D. WOODWARD  3,074,482
DOWN HOLE PIPE PLUGGING TOOL
Filed Feb. 10, 1960
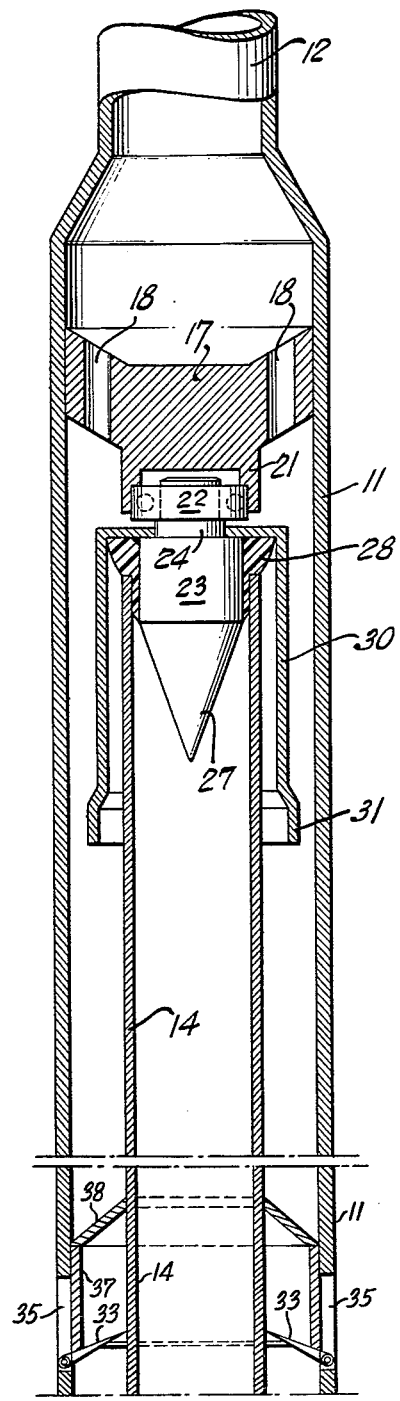
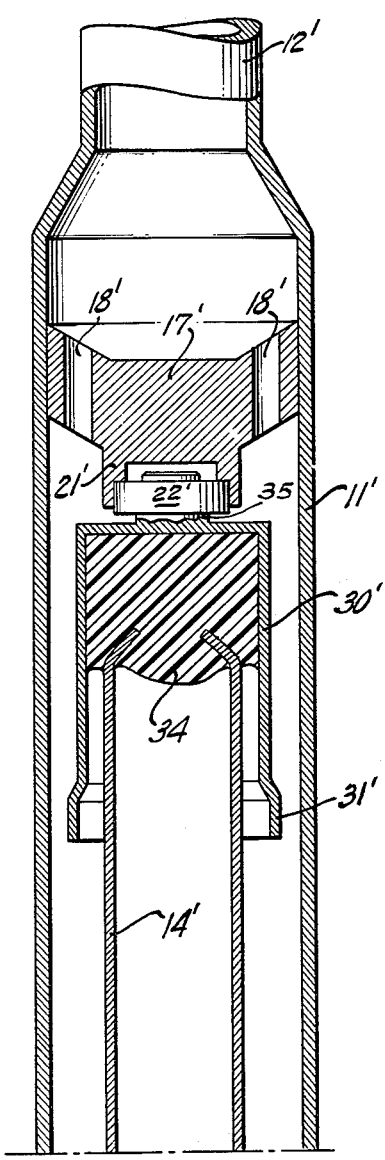

United States Patent Office 3,074,482
Patented Jan. 22, 1963

3,074,482
DOWN HOLE PIPE PLUGGING TOOL
Charles D. Woodward, Houston, Tex., assignor to Texaco Inc., New York, N.Y., a corporation of Delaware
Filed Feb. 10, 1960, Ser. No. 7,902
6 Claims. (Cl. 166—55.6)

This invention is concerned with a down hole pipe-plugging tool. More specifically, a tool in accordance with this invention is one that is applicable to operations where fishing is being carried out down a deep well and the operations involve outside hydraulically actuated tools.

In down hole fishing operations, there are many times when a stuck fish is to be cut or operated upon using outside, hydraulically actuated tools. The operation of such tools depends upon the buildup of hydraulic pressure in the fluid that is circulated down and around the stuck fish, in the annulus between the outside thereof and the inside of the washover pipe accompanying the tool. It has been found that in some instances such a fish is open for circulation of fluid therethrough. Under these circumstances, fluid apparently channels back around the fish in spite of it being stuck. When this is the situation, outside hydraulically actuated tools will not operate properly, if at all, because the circulation of fluid through the fish bypasses the hydraulic actuator elements of said tool and renders them inoperative.

Consequently, it is an object of this invention to provide a plugging tool for closing the top of a stuck fish in order to prevent circulation of fluid therethrough.

Another object is to provide a plugging tool that will operate to plug the top of a stuck fish, even where the fish has a ragged edge, e.g. due to a twist off or the like.

Briefly, this invention concerns a tool for down hole fishing operations wherein the fish is open allowing fluid to circulate therethrough. The tool comprises an overshot pipe for surrounding said fish, and relatively soft material plugging means for closing the top of said fish in order to cut off circulation of fluid therethrough. The tool also comprises means for supporting said plugging means centrally within said overshot pipe, and passage means through said support means for permitting fluid circulation within said overshot pipe and outside of said fish.

The foregoing and other objects and benefits of the invention will be appreciated more fully in connection with the more detailed description which follows, and which is illustrated in the drawing, in which:

FIG. 1 is an elevation, largely in longitudinal cross section, showing the elements of a tool in accordance with one embodiment of the invention; and FIG. 2 is another elevation, largely in longitudinal cross section, showing another embodiment of the invention.

Referring to FIG. 1, it is pointed out that the tool according to this invention is carried within a washover pipe 11 which may have any predetermined length, depending upon the particular fishing operation and other aspects of the use to which this plugging tool is to be put. Washover pipe 11 is attached at the bottom of a smaller diameter pipe 12 that extends to the surface, and that is employed to have the circulating fluid sent down therethrough.

Washover pipe 11, when in place, extends down around a fish 14 which may be embodied by various types of equipment that has become stuck in a well; but usually it will be drill stem, that it is desired to recover.

It is to be noted that the fishing operations, to which the tool of this invention applies, make use of circulating fluid that travels down around the fish 14, i.e. in the annulus between fish 14 and the washover pipe 11. It will be clear however, that if the fish 14 is open so that fluid may circulate down through the center thereof (in the absence of this plugging tool) then the circulation of fluid (down the pipe 12) within the washover pipe 11 would tend to flow within the fish 14 and therefore bypass the annular space outside of the fish. When a tool according to this invention is employed, however, such circulation through the fish 14 is cut off. Thus, the plugging elements of this tool are illustrated in position at the top of the fish 14, for plugging the opening thereof.

Attached within the washover pipe 11, there is a support member 17 that has a plurality of openings or passages 18 therethrough. These passages 18 are to allow flow of circulating fluid past the body of support member 17. Member 17 may be fastened within the washover pipe 11 in any convenient manner, such as by having a friction fit, on the inside thereof. In some instances it might be desirable to have the member 17 made integrally as a fixed part within the washover pipe 11, so that it is securely fastened at one location therein. However, it is contemplated that the more usual manner of supporting member 17 within washover pipe 11 will be to provide a friction fit therebetween, so that the member 17 may be moved or will slide longitudinally within the pipe 11 after contact has been made with the top of the fish 14 by the plug structure that is supported beneath member 17.

Support member 17 has a centrally located cylindrical extension 21 that has structure for supporting one of the races of a bearing 22 that acts both as a thrust and a low friction bearing to allow free rotation of a central plug core 23 plus other elements attached thereto. Plug core 23 has a smaller diameter extension thereof 24 that carries the other (complementary) race of the bearing 22. In addition, plug core 23 has a conical, pointed, tip 27 for guiding the plug core and plug into the opening of the fish 14.

Surrounding the core 23, and securely bonded thereto, there is a tapered soft material layer 28 that may be made of lead or rubber or the like and that acts to tightly seal the top opening of the fish 14 when the plug is in place thereon.

The core 23 and layer 28 therearound (in addition to an inverted cup-shaped guide element 30) are all securely fastened together as a unit, in any convenient manner, e.g. by shrink fits between guide element 30 and the core extension 24, plus a strong bonding of soft layer 28 to the core 23 and to guide element 30. All these elements together thus constitute the plug.

It will be observed that this guide element 30 takes the form of an inverted cup shaped element that has the plug core 23, and its surrounding layer 28, centrally located at the base of the cup structure. At the open end of the inverted cup of guide element 30 there is a flared lip 31 that aids in the guiding action, as the plug is lowered over the end of the fish 14.

A substantial distance below the top of fish 14 the washover pipe 11 carries a plurality of circumferentially spaced outside cutting tools 33 which are pivotally mounted in recesses 35 in the washover pipe. Cutting tools 33 are urged into cutting position against the fish by a longitudinally movable cylindrical cam sleeve 37 which carries a closure 38 on the upper end thereof to receive hydraulic pressure from the drilling fluid. Such a tool is described in U.S. Patent No. 2,542,445.

OPERATION

The operation of the tool of this invention will include first a lowering of a predetermined length of washover pipe 11 down the hole (not shown) and around the fish 14 that it is desired to recover. It is pointed out that the hydraulic outside tool that is employed in conjunction with this plugging tool, is located further down the washover pipe 11 as illustrated in the FIG. 1 showing. When the washover pipe 11 has been lowered over the fish 14 far enough, the guide element 30 (with its flared lip 31) will pass over the upper extremity of the fish 14 and insure the centralizing, or surrounding of the fish by the cup shaped portion of the guide 30. Then, if the fish 14 is still not exactly centered within the inverted cup member 30, additional centralizing will take place upon the contacting of the walls of fish 14 by the conical tip 27 of the core 23 of the plug structure. Finally, as the washover pipe 11 (with internal plug structure therein) is lowered far enough, the top edge of the fish 14 will press into, and be plugged by the layer 28 of the plug that surrounds core 23 and that is securely bonded thereto. This will then tightly plug the opening at the top of the fish 14 so that no circulation of fluid may take place within the fish.

Now with the plugging action completed, the operation of the outside hydraulically actuated tool may be carried out successfully. This is partly by reason of the passages 18, which allow circulation of fluid down from the space within pipe 12 and on into the annular space within washover pipe 11 lying outside of the fish 14 to apply fluid pressure to the top of closure 38.

Most operations of the type with which this invention is concerned, involve rotation of the washover pipe 11 in connection with the operation, e.g. during cutting action of an outside cutting tool 33. Under these circumstances, the bearing 22 acts to allow low friction free rotation of the washover pipe 11 (and the support member 17 therein) relative to the plug unit and the fish 14, that are quite tightly connected together by the plugging action.

FIG. 2 illustrates another embodiment of the invention, that is adapted for use where the top edges of the fish are uneven or ragged, e.g. due to twist off or the like. Many of the elements are identical with those in the FIG. 1 embodiment and need not be described here. These elements are indicated with the same reference numbers used in FIG. 1 but using a primed mark.

In this embodiment, the guide element 30' has within the inverted cup structure thereof, a substantial quantity of soft material 34 filling the entire base cavity (or top thereof when in normal inverted position as shown in the drawing) so that the guide 30' and material 34 together form the plug for fish 14'. Here again, this soft material 34 may be lead, or rubber, or the like such that it will allow the ragged edges of the top of fish 14' to penetrate therein sufficiently to create a tight seal.

In the FIG. 2 embodiment, since there is no core structure comparable to the core 23 of the FIG. 1 plug; there is an integrally formed shaft 35 that extends from the base of the inverted cup of guide element 30'. This shaft 35 is what supports, and provides the structure for carrying, one race of the bearing 22'. This is the free rotation connection for supporting the plug structure from the support member 17' within the washover pipe 11'.

While certain preferred embodiments of the invention have been illustrated and described herein, this is not to be taken as in any way limiting the invention but merely as being descriptive thereof.

What is claimed as the invention is:

1. A down hole pipe plugging tool comprising plugging means for closing the upper extremity of a stuck pipe, overshot pipe means for surrounding said stuck pipe, and support means for centrally supporting said plugging means within said overshop pipe means, said support means including means rotatably supporting said plugging means for rotation relative to said overshot pipe means, and said support means having passage means therethrough.

2. A tool in accordance with claim 1, wherein said plugging means includes an inverted cup shaped guide for directing said plugging means onto said upper extremity of a stuck pipe.

3. In fishing apparatus, a fish plugging tool for use in the event that the fish is open allowing circulation therethrough comprising a plug for closing the upper end of said fish, support means including a bearing for rotatably supporting said plug, said plug including guide means for directing said plug onto the top of said fish, a washover pipe for surrounding said fish and carrying fluid, a hydraulically actuated cutting tool carried by said pipe below said plug, said support means having a passage means therethrough for permitting circulation of fluid down through said washover pipe and surrounding said fish into operating contact with said cutting tool.

4. In fishing apparatus, a fish plugging tool for use in the event that the fish is open allowing circulation therethrough comprising a plug for closing the upper end of said fish, support means including a bearing for rotatably supporting said plug, said plug including an inverted cup shaped guide for directing said plug on to the top of said fish, a washover pipe for surrounding said fish and carrying fluid, a hydraulically actuated cutting tool carried by said pipe below said plug, said support means locating said guide and plug centrally within said washover pipe, and fluid passage means through said support means for permitting circulation of fluid down through said washover pipe and surrounding said fish into operating contact with said cutting tool.

5. The invention according to claim 4 wherein said plug includes a pointed centralizing element for guiding said plug into the opening at the top of the fish.

6. The invention according to claim 4 wherein said plug comprises a quantity of soft material filling the base of said cup shaped guide.

References Cited in the file of this patent

UNITED STATES PATENTS

| | | |
|---|---|---|
| 1,594,303 | Keown et al. | July 27, 1926 |
| 2,647,008 | Stewart et al. | July 28, 1953 |
| 2,832,423 | Hall | Apr. 29, 1958 |
| 2,865,454 | Richards | Dec. 23, 1958 |